United States Patent [19]

Cordiano

[11] 4,221,126
[45] Sep. 9, 1980

[54] ELECTRONIC DEVICE FOR INDICATING ENGINE SPEED

[75] Inventor: Ettore Cordiano, Turin, Italy

[73] Assignee: Fiat Auto S.p.A., Turin, Italy

[21] Appl. No.: 962,732

[22] Filed: Nov. 21, 1978

[30] Foreign Application Priority Data

Dec. 22, 1977 [IT] Italy ............................. 69879 A/77

[51] Int. Cl.³ ............................................ G01M 15/00
[52] U.S. Cl. .................................... 73/116; 324/169; 340/52 R
[58] Field of Search ............... 73/114, 116; 324/169; 340/52 R, 53; 58/146

[56] References Cited
U.S. PATENT DOCUMENTS

| 3,781,656 | 12/1973 | Glew | 324/169 X |
| 3,925,753 | 12/1975 | Auman et al. | 340/52 R |
| 3,983,480 | 9/1976 | Meserow et al. | 324/169 |
| 3,983,533 | 9/1976 | Goszyk et al. | 340/52 R |

Primary Examiner—Jerry W. Myracle
Attorney, Agent, or Firm—Sughrue, Rothwell, Mion, Zinn & Macpeak

[57] ABSTRACT

An electronic indicator device for providing an audible or visible indication when an internal combustion engine to which the device is fitted reaches a predetermined rotational speed so that the driver can, if he wishes, change gear or reduce speed in order to save fuel. The device includes a detector for sensing electrical impulses generated by the engine ignition circuit in operation thereof and for producing an output signal the frequency of which is related to engine speed. This frequency signal is converted to an analogue voltage signal in a frequency-to-voltage converter and the output of the converter is compared with a reference voltage to provide an electrical output signal to a lamp, buzzer or the like when the engine speed reaches the value determined by the reference voltage level.

4 Claims, 1 Drawing Figure

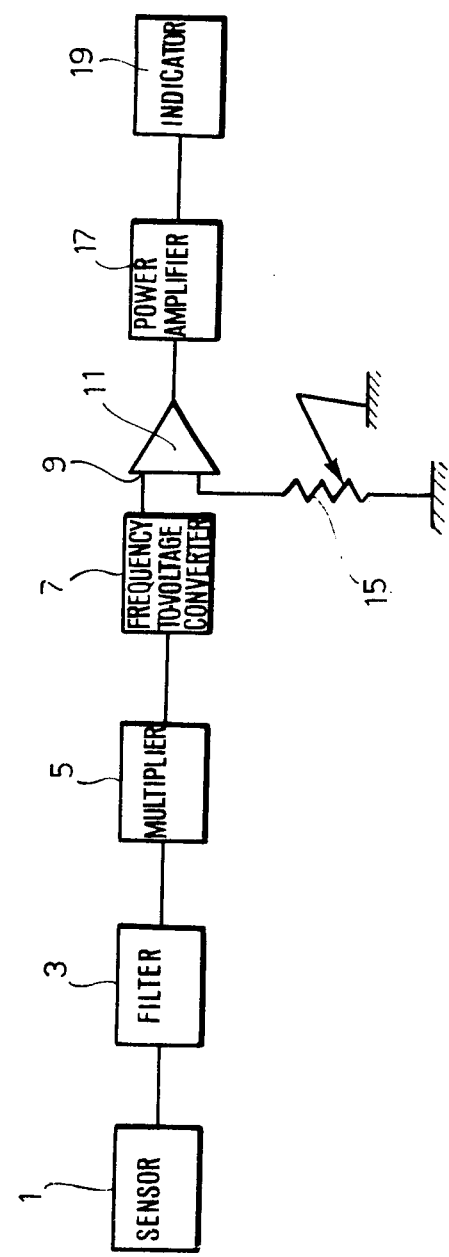

ELECTRONIC DEVICE FOR INDICATING ENGINE SPEED

BACKGROUND OF THE INVENTION

The present invention relates to a fuel economy indicator for a motor vehicle having an internal combustion engine, and particularly to an electronic device for providing an indication when the operating conditions of the internal combustion engine are such that the fuel consumption exceeds a predetermined threshold.

It is known that the fuel consumption of a motor vehicle having an internal combustion engine depends essentially on the speed of revolution of the engine, that is to say there is a range of engine speeds within which the fuel consumption diminishes notably if the engine is restricted to remain within this range in the various gears.

Fuel consumption indicators as such are already known. One known system operates to detect the induction air pressure, the engine operating temperature, the number of revolutions of the engine and the gear selected, and on the basis of the values of all these to signal to the driver the necessity, if the fuel consumption is to be limited, to change to a higher gear or to reduce speed. Such very complex devices are, however, very expensive, and cannot therefore be incorporated in mass produced motor vehicles intended for ordinary use.

There are, of course, some systems which are much simpler, for example if the motor vehicle has a revolution counter this may be provided with indicia which indicate the region within which it is necessary to restrict the engine speed by, for example, changing to a higher gear, in order to save fuel. Although such devices may work in theory, they are almost useless in practice since they require the frequent attention of the driver which detracts from his concentration on driving and thus increases the risk of accidents.

OBJECTS OF THE INVENTION

The primary object of the present invention is to provide an electronic device able to produce an audible and/or visual signal at the point where the operating conditions of an internal combustion engine are such that the fuel consumption reaches a predetermined threshold above which it is considered to be uneconomic.

Another object of the invention is to provide an electronic fuel economy indicator which is of simple construction, and of low cost.

SUMMARY OF THE INVENTION

The above objects are achieved, according to the invention, by an electronic indicator device for providing an indication of when the rotational speed of a spark ignition internal combustion engine reaches a predetermined rotational speed, comprising:

detector means for detecting electrical impulse generated by the engine ignition circuit and operating to produce a frequency signal in response thereto, converter means, means connecting said converter means to the output of said detector means, said converter means operating to produce an output voltage signal the value of which is dependent on the frequency of said frequency signal, means for generating a reference voltage representing the value of said voltage signal at said predetermined rotational speed of said engine, comparator means having first and second inputs, said first input being connected to the output of said converter means and said second input being connected to the output of said means for generating a reference voltage, said comparator operating to produce an output signal only when there is substantial equality between the signals at its first and second inputs, and indicator means connected to the output of said comparator means and operating to produce at least one of a visual and an audible indication when said comparator means produces an output signal, whereby to indicate the occurrence of said predetermined rotational speed of said engine.

Other features and advantages of the invention will become apparent from a consideration of the following description in which reference is made to the single figure of the attached drawing, which is provided purely by way of non-limitative example.

BRIEF DESCRIPTION OF THE DRAWING

FIG. 1 is a block schematic diagram of a control device providing a signal indicating when a predetermined threshold of fuel consumption of a motor vehicle has been reached.

DESCRIPTION OF THE PREFERRED EMBODIMENT

In the drawing there is shown a sensor device 1 for detecting electrical pulses generated by the ignition circuit of the vehicle engine, the output of the sensor device 1 is connected to a filter circuit 3 the output of which feeds a multiplier circuit 5. The output of the multiplier 5 is connected to a frequency-to-voltage converter 7 connected to a first input 9 of a comparator 11 the second input of which is fed via a variable resister 15; the output of the comparator 11 is fed to a power amplifier stage 17 connected to an indicator device 19, which may be an acoustic indicator such as a buzzer, a visual indicator such as a lamp on the instrument panel, or may operate to provide both an audible and a visual output when energised.

The device described above operates as follows:

The signal provided by the sensor device 1, taken for example from the coil of the ignition circuit or from the contact breaker of the ignition distributor, is passed to a filter circuit 3 which eliminates the inevitable transient voltage peaks which arise due to a physical characteristics of the ignition circuit, principally the presence of the spark suppression capacitor and the inductance of the winding of the ignition coil.

The output signal from the filter circuit 3 is fed to a multiplier 5 which multiplies the signal by a suitable scale factor. This scale factor depends on the number of cylinders of the motor (two for motors with four cylinders, three for motors with six cylinders and so on); the value of the scale factors will be determined and fixed when the device is being installed on a motor vehicle. At the output of the multiplier 5, therefore, there will be a signal the frequency of which represents the speed of the motor, that is to say, in effect, the number of rotations per minute of the motor shaft; this signal is fed to the frequency-to-voltage converter 7 which converts the frequency signal into a voltage proportional to the speed of rotation of the engine.

This voltage signal is compared in the comparator 11 with an adjustable reference voltage representative of the number of revolutions per minute of the engine the attainment of which it is desired to indicate. Adjustment of the reference voltage is effected by means of the variable resistor 15.

The comparator 11 is of a type which provides an output signal only when the two input signals are equal to one another so that only when the number of revolutions per minute of the engine predetermined by adjusting the variable resistor 15 is reached, is the visual or audible indicator 19 caused to produce an indication to the driver, without him being distracted from driving, that the number of revolutions which must not be exceeded if it is desired to save fuel has been attained.

When this occurs the driver can, if he wishes and as circumstances demand, either change gear or reduce the number of revolutions of the engine; alternatively, if he wishes to obtain higher performance, he can continue driving in the same way and in this case the indication from the device ceases when the number of revolutions exceeds that determined by the reference voltage so that the driver is not distracted by a continuous indication at higher engine speeds.

Having particularly described the invention and a practical embodiment thereof those skilled in the art will appreciate that the particular details set out can be widely varied with respect to what has been described and illustrated herein above, without by this departing from the spirit and scope of the present invention.

What is claimed is:

1. An electronic indicator device permanently affixed to a motor vehicle for providing an indication of when the rotational speed of a spark ignition internal combustion engine having a number of cylinders reaches a predetermined rotational speed, comprising:

detector means for detecting electrical impulses generated by the engine ignition circuit and operating to produce a frequency signal in response thereto, converter means, multiplying means connecting said converter means to the output of said detector means, said multiplying means including a multiplier circuit operating to multiply said frequency signal by a factor related to said number of cylinders in said internal combustion engine, said converter means operating to produce an output voltage signal the value of which is dependent on the frequency of said multiplied frequency signal, means for generating a reference voltage representing the value of said voltage signal at said predetermined rotational speed of said engine, comparator means having first and second inputs, said first input being connected to the output of said converter means and said second input being connected to the output of said means for generating a reference voltage, said comparator operating to produce an output signal only when there is substantial equality between the signals at its frist and second inputs, and indicator means connected to the output of said comparator means and operating to produce at least one of a visual and an audible indication when said comparator means produces an output signal, whereby to indicate the occurrence of said predetermined rotational speed of said engine.

2. The electronic indicator device of claim 1, wherein said means connecting said converter means to the output of said detector means includes a filter circuit operating to filter out the excess voltage peaks generated by said ignition circuit in operation thereof and detected by said detector means.

3. The electronic indicator device of claim 1, wherein there is further provided a power amplifier stage between said comparator means and said indicator means.

4. The electronic indicator device of claim 1, wherein said reference voltage generator means is adjustable whereby to adjust said predetermined rotational speed of said internal combustion engine at which an output indication is provided by said device.

* * * * *